(12) United States Patent
Soo et al.

(10) Patent No.: US 9,761,065 B2
(45) Date of Patent: Sep. 12, 2017

(54) REGENERATIVE BRAKING COACHING SYSTEM

(71) Applicant: Ford Global Technologies, LLC, Dearborn, MI (US)

(72) Inventors: Brian Thomas Soo, West Bloomfield, MI (US); Bernard D. Nefcy, Novi, MI (US); David Paul Tourner, Novi, MI (US); Francis Thomas Connolly, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 94 days.

(21) Appl. No.: 14/641,692

(22) Filed: Mar. 9, 2015

(65) Prior Publication Data

US 2016/0267726 A1  Sep. 15, 2016

(51) Int. Cl.
| | |
|---|---|
| *B60T 8/17* | (2006.01) |
| *B60T 8/32* | (2006.01) |
| *B60T 17/22* | (2006.01) |
| *G07C 5/06* | (2006.01) |
| *B60L 7/10* | (2006.01) |
| *B60L 15/20* | (2006.01) |
| *B60L 7/18* | (2006.01) |
| *B60T 1/10* | (2006.01) |

(52) U.S. Cl.
CPC ............... *G07C 5/06* (2013.01); *B60L 7/10* (2013.01); *B60L 7/18* (2013.01); *B60L 15/2045* (2013.01); *B60T 1/10* (2013.01); *B60T 17/22* (2013.01); *Y02T 10/642* (2013.01); *Y02T 10/72* (2013.01); *Y02T 10/7283* (2013.01)

(58) Field of Classification Search
CPC ......... B60W 10/08; B60L 7/18; B60L 3/0061; B60L 7/10
See application file for complete search history.

(56) References Cited

U.S. PATENT DOCUMENTS

| | | |
|---|---|---|
| 7,703,563 B2 | 4/2010 | Aldrich, III et al. |
| 8,135,526 B2 * | 3/2012 | Minarcin ............... B60K 6/365 180/65.285 |

(Continued)

FOREIGN PATENT DOCUMENTS

WO  2014090799 A1  6/2014

*Primary Examiner* — Thomas G Black
*Assistant Examiner* — Demetra Smith-Stewart
(74) *Attorney, Agent, or Firm* — David B. Kelley; Brooks Kushman P.C.

(57) ABSTRACT

A vehicle includes a regenerative braking system, which may include an electric machine, configured to provide regenerative braking torque to vehicle traction wheels. The vehicle further includes at least one controller configured to provide indicia for display to indicate performance of the regenerative braking system. The indicia represent a comparison of a braking profile that is recorded during a deceleration event and a calculated braking profile that is based on a detected forward object. In various embodiments, the indicia may include a numerical or letter grade representative of a similarity between the recorded braking profile and the calculated braking profile and/or a visual representation of the comparison of the recorded braking profile and the calculated braking profile.

19 Claims, 3 Drawing Sheets

(56) References Cited

U.S. PATENT DOCUMENTS

| | | | |
|---|---|---|---|
| 8,543,273 B2* | 9/2013 | Pfefferl | B60T 1/10 180/65.265 |
| 8,855,844 B2* | 10/2014 | Schwindt | B60K 31/0008 701/70 |
| 9,327,731 B2* | 5/2016 | Keeney | B60W 30/18127 |
| 2003/0182044 A1* | 9/2003 | Nakamura | B60T 8/00 701/70 |
| 2011/0246012 A1* | 10/2011 | McClain | B60L 7/18 701/22 |
| 2012/0139329 A1* | 6/2012 | Fabini | B60L 7/10 303/3 |
| 2012/0179347 A1* | 7/2012 | Aldighieri | B60T 1/10 701/70 |
| 2013/0090822 A1 | 4/2013 | Schwindt | |
| 2013/0328386 A1 | 12/2013 | Strengert et al. | |
| 2015/0084760 A1* | 3/2015 | Lee | B60T 1/10 340/439 |
| 2016/0039395 A1* | 2/2016 | Niwa | B60W 30/18109 701/70 |
| 2016/0243958 A1* | 8/2016 | Miller | B60L 11/1816 |
| 2016/0244044 A1* | 8/2016 | Miller | B60W 10/06 |
| 2016/0257288 A1* | 9/2016 | Miller | B60T 1/10 |
| 2016/0257295 A1* | 9/2016 | Miller | B60W 50/0097 |

* cited by examiner

REGENERATIVE BRAKING COACHING SYSTEM

TECHNICAL FIELD

This disclosure relates to systems and methods for controlling a vehicle equipped with adaptive cruise control and braking systems.

BACKGROUND

Adaptive Cruise Control (ACC) systems use an on-board sensor (usually RADAR or LIDAR) to detect the distance between the host vehicle and a vehicle ahead of the host vehicle (the lead vehicle), and the relative speed difference between the vehicles. The system then automatically adjusts the speed of the host vehicle to keep it at a pre-set distance behind the lead vehicle, even in most fog and rain conditions. Typically, the host vehicle driver can set a desired/minimum following distance and/or a time gap to be maintained between vehicles. The ACC generates automatic interventions in the powertrain and/or braking systems of the host vehicle to slow the vehicle as necessary to maintain the selected minimum following distance.

SUMMARY

A vehicle according to the present disclosure includes a regenerative braking system, which may include an electric machine, configured to provide regenerative braking torque to vehicle traction wheels. The vehicle further includes at least one controller configured to provide indicia for display to indicate performance of the regenerative braking system. The indicia represent a comparison of a braking profile that is recorded during a deceleration event and a calculated braking profile that is based on a detected forward object. In various embodiments, the indicia may include a numerical or letter grade representative of a similarity between the recorded braking profile and the calculated braking profile and/or a visual representation of the comparison of the recorded braking profile and the calculated braking profile.

In some embodiments, the calculated braking profile corresponds to a maximum regeneration braking distance that is based on a powertrain regenerative braking limit and a distance to the detected forward object. In various embodiments the controller is further configured to provide the indicia in response to a driver request, or in response to a detected conclusion of a braking event. The controller may be further configured to provide the indicia in response to a vehicle economy mode being active.

A method of controlling a vehicle with a regenerative braking system according to the present disclosure includes providing audio or visual driver feedback after a deceleration event. The feedback is based on a recorded acceleration/deceleration profile and on a calculated acceleration/deceleration profile. The recorded profile is recorded during the deceleration event. The calculated profile is based on a detected forward object, and may be based on a maximum regeneration braking distance based on a powertrain regenerative braking limit and a distance to the detected forward object. The recorded profile may include a recorded acceleration portion and a recorded deceleration portion, and the calculated profile may include a calculated acceleration portion and a calculated deceleration portion.

A vehicle according to the present disclosure includes an electric machine configured to provide regenerative braking torque to traction wheels, wheel brakes configured to provide friction braking torque to the traction wheels, and at least one power source configured to provide drive torque to the traction wheels. The vehicle additionally includes at least one controller configured to provide audio or visual driver feedback after a deceleration event involving the electric machine, wheel brakes, or power source. The feedback is based on a recorded acceleration/deceleration profile and on a calculated acceleration/deceleration profile. The calculated profile is based on a detected forward object.

Embodiments according to the present disclosure provide a number of advantages. For example, the present disclosure provides a system and method for coaching a driver to brake in a fashion to increase kinetic energy recaptured through regenerative braking This consequently increases overall vehicle fuel economy.

The above advantage and other advantages and features of the present disclosure will be apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Adaptive Cruise Control (ACC) refers to a control method for automatically controlling a vehicle including maintaining both a desired speed and a safe distance from forward vehicles in the lane of travel. A host vehicle equipped with ACC is configured to maintain at least a predefined distance from a target vehicle positioned forward of the host vehicle. An ACC system generally includes at least one sensor, such as RADAR, LIDAR, ultrasonics, or other sensors or combinations thereof. The ACC system is configured to directly or indirectly control throttle and brake systems to control vehicle acceleration and deceleration according to an ACC algorithm.

Some vehicles equipped with ACC systems may also include powertrains equipped for regenerative braking Regenerative braking refers to the recapture and storage of vehicle kinetic energy for subsequent use by the vehicle. Regenerative braking systems generally include an electric machine or motor/generator configured to apply braking torque to vehicle traction wheels and generate electric power. Other systems may include accumulators, flywheels, or other mechanisms for storing energy for subsequent use.

Figure 1:
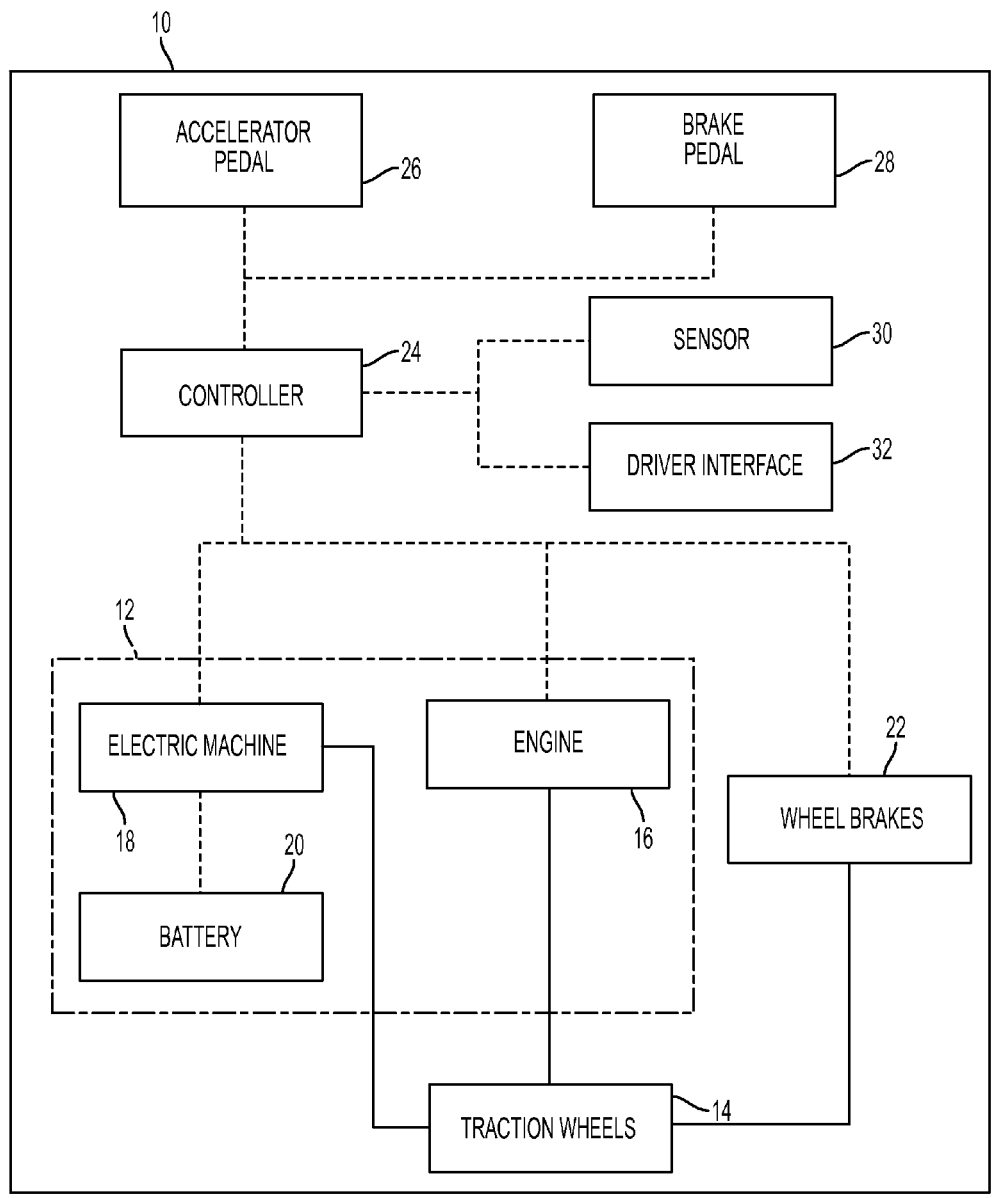
FIG. 1 is a schematic representation of a vehicle according to the present disclosure.

Referring now to FIG. 1, a vehicle 10 according to the present disclosure is illustrated in schematic form. The vehicle 10 includes a hybrid powertrain 12 configured to deliver power to traction wheels 14. The hybrid powertrain 12 includes an internal combustion engine 16 and at least one electric machine 18, each configured to deliver power to the vehicle traction wheels. The electric machine 18 is electrically coupled to a battery 20. In various embodiments, the powertrain 12 may be arranged as a series, parallel, or series-parallel powertrain.

The electric machine 18 is also configured to provide regenerative braking torque to the fraction wheels 14, in which rotational energy from the traction wheels 14 is converted to electrical energy. Electrical energy generated by the electric machine 18 may be stored in the battery 20 for subsequent use by the vehicle 10.

The vehicle 10 additionally includes wheel brakes 22 configured to provide friction braking torque to the traction wheels 14.

The electric machine 18, engine 16, and wheel brakes 22 are all in communication with or under the control of at least one controller 24. Although illustrated as a single controller, the controller 24 may be part of a larger control system and/or may be controlled by various other controllers throughout the vehicle 10. In one embodiment, the controller 24 is a powertrain control unit (PCU) under the control of a vehicle system controller (VSC). The controller 24 and one or more other controllers can collectively be referred to as a "controller." The controller 24 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The vehicle 10 additionally includes an accelerator pedal 26 and a brake pedal 28. In response to a driver actuation of the accelerator pedal 26, the controller 24 is configured to coordinate the electric machine 18 and engine 16 to provide power to the traction wheels 14. In response to a driver actuation of the brake pedal 28, the controller 24 is configured to control the electric machine 18 and/or wheel brakes 22 to provide braking torque to the traction wheels 14.

Regenerative braking systems generally have a powertrain braking torque limit, referring to a maximum amount of braking torque the system is capable of applying to traction wheels under current operating conditions. In typical regenerative braking systems including an electric machine acting as a generator, the regenerative braking torque limit is generally based on motor torque capabilities, current gear in embodiments having a step-ratio transmission, battery energy delivery limits (e.g. a battery state of charge), and other powertrain limits.

In response to a brake request that does not exceed the regenerative braking torque limit, the controller 24 is configured to control the electric machine 18 to provide regenerative braking torque to satisfy the braking request. In response to a braking request that does exceed the regenerative braking torque limit, the controller 24 is configured to control the electric machine 18 and wheel brakes 22 to satisfy the braking request.

The vehicle 10 further includes at least one sensor 30. The sensor 30 may include RADAR, LIDAR, ultrasonic sensors, or other sensors or a combination thereof. The sensor 30 is configured to detect objects forward of the vehicle 10. In particular, the sensor 30 is oriented to detect a vehicle forward and in a same driving lane as the vehicle 10. The controller 24 may be configured to control the vehicle acceleration and braking according to an ACC algorithm in response to detection of a forward vehicle via the sensor 30. This may include coordinating the engine 16 and/or electric machine 18 to satisfy an ACC acceleration request. This may additionally include coordinating the engine 16, electric machine 18, and/or wheel brakes 22 to satisfy an ACC deceleration request. In some embodiments, the sensor 30 may be provided for use in systems other than an ACC system.

The vehicle 10 also includes a driver interface 32. The driver interface 32 preferably includes a multi-function touch display configured to receive driver inputs and visually convey information. The driver interface 32 preferably also includes an economy mode ("ECO MODE") button. Various vehicle systems may be configured to operate in a first mode in response to the ECO MODE button being inactive and a second mode in response to the ECO MODE button being active. The driver interface 32 may additionally include a speaker system and be configured to convey information to a driver via audio signals. In other embodiments, the driver interface may include other systems configured to convey information to a driver, such as selectively illuminated indicator lights or a projected heads-up display (HUD).

Figure 2:
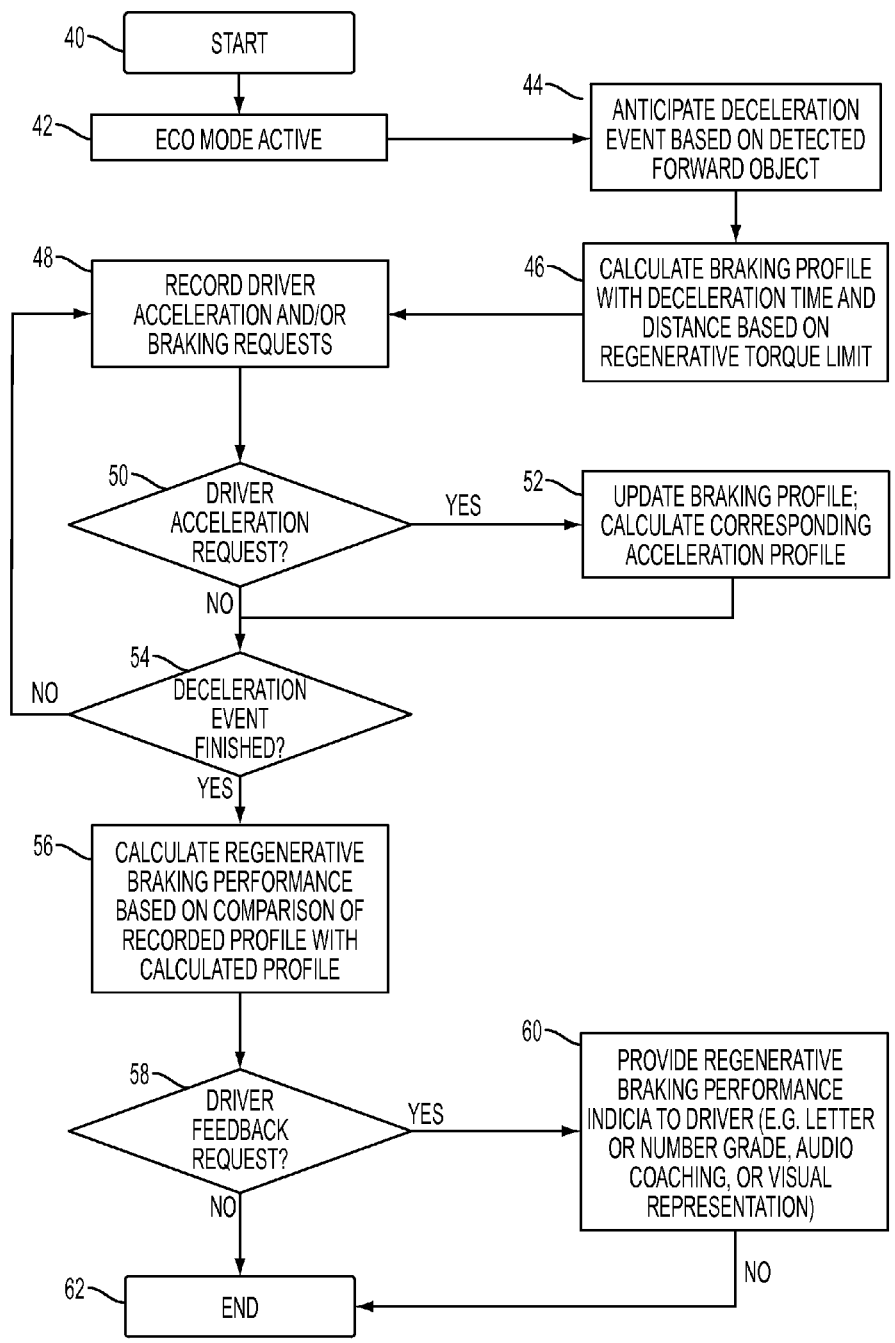
FIG. 2 illustrates a method of controlling a vehicle according to the present disclosure in flowchart form.

Referring now to FIG. 2, a method of controlling a vehicle according to the present disclosure is illustrated in flowchart form. The method begins at block 40. The vehicle ECO MODE is activated, as illustrated at block 42. A deceleration event is anticipated based on detection of a forward object, as illustrated at block 44. The deceleration event may correspond to a detected forward vehicle in a same lane as the host vehicle, when the forward vehicle is traveling more slowly than the host vehicle.

A braking or deceleration profile is calculated, including a deceleration time and distance, as illustrated at block 46. The deceleration time and distance are calculated based on a powertrain regenerative torque limit. In a preferred embodiment, the deceleration time and distance correspond to the time and distance required to decelerate the vehicle while the electric machine provides regenerative torque to the traction wheels, with the regenerative torque magnitude being approximately equal to the powertrain regenerative torque limit. This calculation may be performed using known kinematics equations and known methods of calculating a current powertrain regenerative torque limit.

Driver acceleration and/or braking requests are then monitored and stored as a recorded acceleration/deceleration profile, as illustrated at block 48. The driver acceleration and braking requests may be received as actuations of the accelerator pedal and brake pedal, respectively.

A determination is then made of whether the driver is requesting acceleration, as illustrated at operation 50. If acceleration is requested, the calculated deceleration profile is updated with a calculated acceleration profile, as illustrated at block 52. The acceleration profile is based on the powertrain regenerative torque limit, such that the vehicle speed according to the acceleration profile is maintained within a range from which the vehicle may be subsequently decelerated based on the detected forward object without application of friction brakes.

Subsequently, a determination is made of whether the deceleration event is finished, as illustrated at operation 54. Similarly, if no driver acceleration request is received at operation 50, a determination is made of whether the deceleration event is finished at operation 54. This may be performed, for example, when vehicle deceleration reduces to approximately zero for a temporal duration exceeding an associated threshold. As another example, the deceleration event may be finished if vehicle speed is reduced until a current vehicle speed is approximately equal to a speed of the detected forward object.

If a determination is made that the deceleration event is not finished, control returns to block 48, such that the acceleration and/or braking requests continue to be recorded through the entire deceleration event.

If a determination is made that the deceleration event is finished, the regenerative braking performance through the deceleration event is calculated, as illustrated at block 56. The regenerative braking performance is based on a comparison of the recorded acceleration/deceleration profile with the calculated acceleration/deceleration profile. This comparison will be discussed in further detail in conjunction with FIGS. 3A and 3B.

A determination is then made of whether a driver has requested feedback, as illustrated at operation 58. In a preferred embodiment, the driver may request feedback via a spoken request. In other embodiments, the driver may request feedback by activation of a button, touch-sensitive icon, or other appropriate interactions with the vehicle.

If a determination is made that the driver requested feedback, then the driver is provided with indicia of regenerative braking performance, as illustrated at block 60. The indicia may be provided via audio feedback (e.g. spoken word), or visual feedback (e.g. presented on a multifunction touch display). In some embodiments, the indicia include a letter or number grade (e.g. "B+" or "75%") based on a correlation between the calculated acceleration/deceleration profile and the recorded acceleration/deceleration profile. In other embodiments, the indicia include detailed audio coaching (e.g. "That was OK. Brake sooner, and brake less."). In yet another embodiment, the indicia include a visual depiction of the recorded and calculated acceleration and deceleration profiles. In another embodiment, the indicia include icon-based representation indicative of braking performance, such as an icon of flower or tree that grows or blooms when the recorded acceleration/deceleration profile closely matches the acceleration/deceleration profile. Combinations of the above or other feedback indicia may also be provided.

After providing feedback, the algorithm ends, as illustrated at block 62. Similarly, if no feedback request is received at operation 58, the algorithm ends.

Variations on the above are, of course, possible. As an example, the algorithm may also be implemented when ECO MODE is inactive. As another example, the method may provide coaching feedback automatically after the deceleration event is finished (e.g. in response to the vehicle being fully stopped or the driver actuating the accelerator pedal) without requiring a driver feedback request.

Figure 3A:
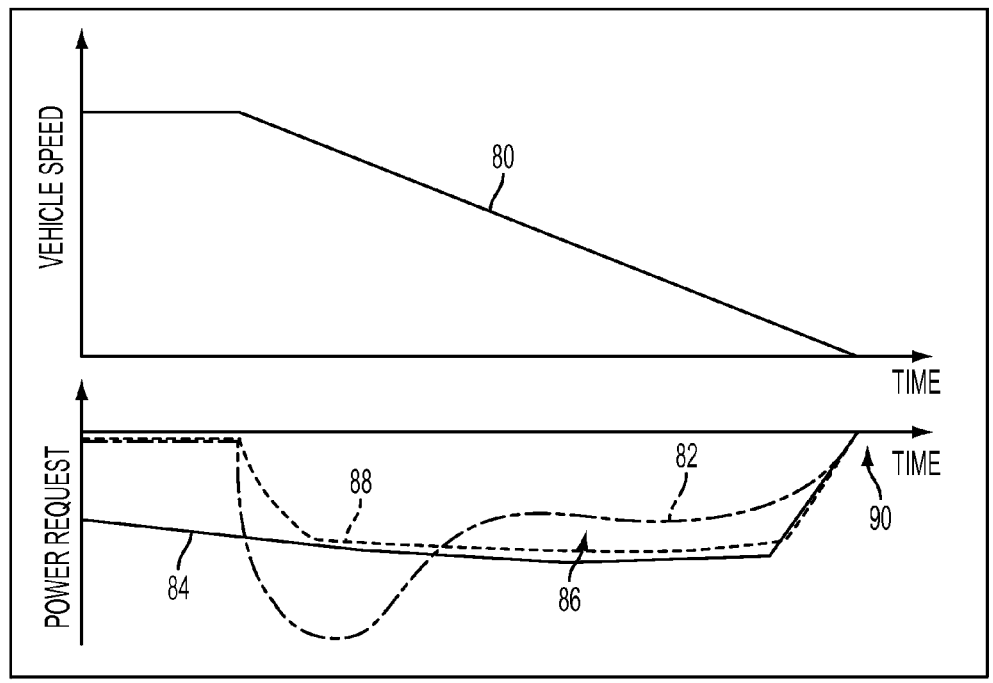
FIGS. 3A and 3B illustrate recorded and calculated acceleration and braking profiles during vehicle acceleration and braking events.

Referring now to FIG. 3A, an exemplary braking event according to the present disclosure is illustrated. In response to a detected forward object, a controller anticipates that a deceleration is necessary, as illustrated at 80. The anticipated deceleration event includes an associated deceleration distance and deceleration time based on the distance to the forward object and the speed of the forward object.

In response to the anticipated deceleration event, driver braking and acceleration requests are monitored and recorded. In practice, drivers may apply the brake pedal inconsistently, as illustrated at 82. During such an inconsistent application of the brake pedal, heavier portions of the driver brake request exceed the regenerative braking torque limit, illustrated at 84, and thus would necessitate coordinated regenerative braking and friction braking to provide braking torque to satisfy the calculated deceleration. In this scenario, the coordinated braking may not recapture the maximum amount of kinetic energy, as illustrated in the region of "missed" regenerative capacity at 86.

In addition to recording the driver brake and acceleration requests, the system calculates an optimized deceleration profile to maximize the recaptured regenerative capacity. In a preferred embodiment, the calculated deceleration profile corresponds to controlling an electric machine to provide regenerative braking torque approximately equal to the regenerative braking torque limit without applying wheel brakes, as illustrated at 88.

After the deceleration event has ended, as illustrated at point 90, the driver requests feedback on regenerative braking performance. The request may be performed in various ways, as discussed above with respect to FIG. 2. The system then provides feedback to the driver, as also discussed above with respect to FIG. 2.

Figure 3B:
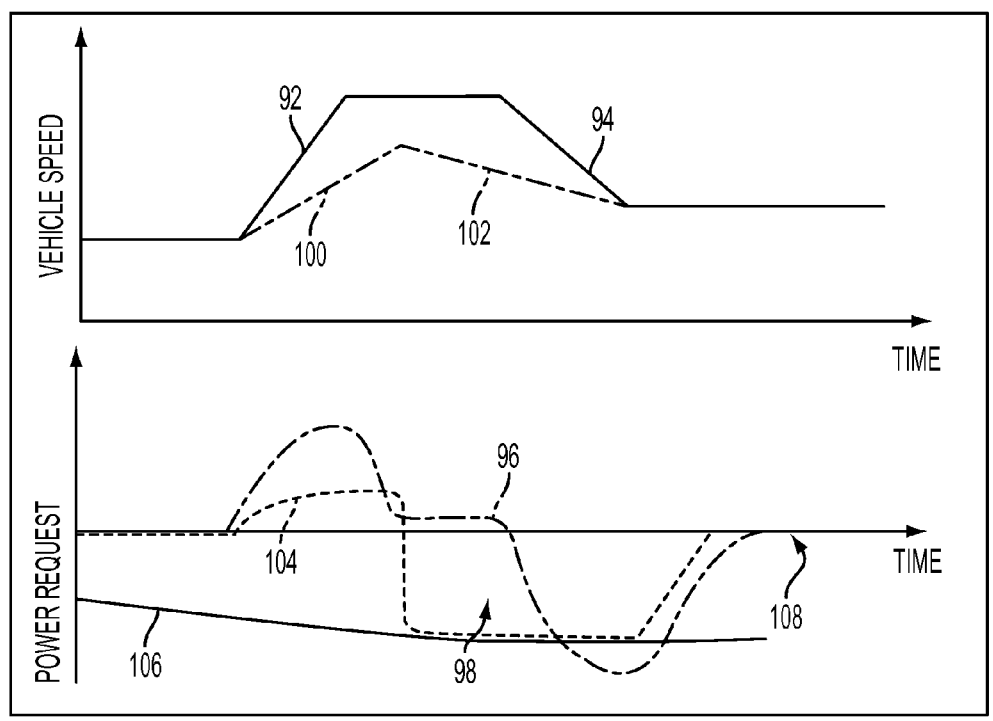

Referring now to FIG. 3B, an exemplary acceleration/deceleration event is illustrated. A driver requests acceleration, as illustrated at 92. A forward object, such as a forward vehicle in a same lane as the host vehicle, necessitates a subsequent deceleration, as illustrated at 94.

In response to detecting the forward object, the system monitors and stores driver acceleration and deceleration requests as a recorded acceleration/deceleration profile. The driver power request for this maneuver, illustrated at 96, may be less efficient, resulting in "missed" regenerative capacity as illustrated at 98.

In addition to recording the driver brake and acceleration requests, the system calculates an optimized acceleration/deceleration profile to maximize the recaptured regenerative capacity. The acceleration/deceleration profile includes an acceleration portion 100, calculated to maintain vehicle speed within a range such that the vehicle may be subsequently decelerated based on the detected forward object without application of friction brakes. The acceleration/deceleration profile also includes a deceleration portion 102, calculated to maximize the recaptured regenerative braking In a preferred embodiment, the deceleration portion corresponds to controlling an electric machine to provide regenerative braking torque, illustrated at 104, approximately equal to the regenerative braking torque limit without applying wheel brakes, illustrated at 106.

After the deceleration event has ended, as illustrated at point 108, the driver requests feedback on regenerative braking performance. The request may be performed in various ways, as discussed above with respect to FIG. 2. The system then provides feedback to the driver, as also discussed above with respect to FIG. 2.

As can be seen, various embodiments provide a system and method for coaching a driver to brake in a fashion to increase kinetic energy recaptured through regenerative braking.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    a regenerative braking system; and
    a controller configured to, in response to completion of a deceleration event, display an indicator, via a vehicle interface, of regenerative braking system performance determined from a comparison of an actual braking profile recorded during the deceleration event and a calculated braking profile calculated based on distance to a detected forward object and maximizing recaptured regenerative braking energy during the deceleration event.

2. The vehicle of claim 1, wherein the regenerative braking system comprises an electric machine.

3. The vehicle of claim 1, wherein the calculated braking profile corresponds to a maximum regeneration braking distance that is based on a powertrain regenerative braking limit.

4. The vehicle of claim 1, wherein the indicator includes one of a numerical grade and a letter grade representative of a similarity between the actual braking profile recorded during the deceleration event and the calculated braking profile.

5. The vehicle of claim 1, wherein the indicator includes a visual representation of the comparison comprising at least one of the actual braking profile, the calculated braking profile, and a difference between the actual and calculated braking profiles.

6. The vehicle of claim 1, wherein the controller is further configured to display the indicator in response to a driver request.

7. The vehicle of claim 1, wherein recording of the deceleration event is triggered in response to the detected forward object.

8. The vehicle of claim 1, wherein the controller is further configured to display the indicator in response to a vehicle economy mode being active.

9. A method of controlling a vehicle with a regenerative braking system, comprising:
    providing driver feedback, via a vehicle interface, of regenerative braking system performance after a deceleration event, based on an actual acceleration/deceleration profile recorded during the deceleration event and on a calculated acceleration/deceleration profile calculated to maximize recaptured regenerative braking energy during the deceleration event.

10. The method of claim 9, wherein the calculated acceleration/deceleration profile is based on a powertrain regenerative braking limit and a distance to a detected forward object.

11. The method of claim 9, wherein the actual acceleration/deceleration profile recorded during the deceleration event includes a recorded acceleration portion and a recorded deceleration portion, and wherein the calculated acceleration/deceleration profile includes a calculated acceleration portion and a calculated deceleration portion.

12. The method of claim 9, wherein the driver feedback includes one of a numerical grade or a letter grade representative of a similarity between the actual acceleration/deceleration profile recorded during the deceleration event and the calculated acceleration/deceleration profile.

13. The method of claim 9, wherein the driver feedback includes a visual representation of a comparison of the actual acceleration/deceleration profile recorded during the deceleration event and the calculated acceleration/deceleration profile.

14. The method of claim 9, wherein the driver feedback is further provided in response to a driver request.

15. A vehicle comprising:
    an electric machine configured to provide regenerative braking;
    a sensor configured to detect a forward object; and
    a controller configured to provide driver feedback, via a vehicle interface, after a deceleration event based on an actual acceleration/deceleration profile recorded during the deceleration event relative to a calculated acceleration/deceleration profile calculated based on at least a distance to the forward object and maximizing recaptured regenerative braking energy during the deceleration event.

16. The vehicle of claim 15, wherein the calculated acceleration/deceleration profile corresponds to a maximum regeneration braking distance that is based on a regenerative braking limit.

17. The vehicle of claim 15, wherein the actual acceleration/deceleration profile recorded during the deceleration event includes a recorded acceleration portion and a recorded deceleration portion, and wherein the calculated acceleration/deceleration profile includes a calculated acceleration portion and a calculated deceleration portion.

18. The vehicle of claim 15, wherein the driver feedback includes one of a numerical grade or a letter grade representative of a similarity between the actual acceleration/deceleration profile recorded during the deceleration event and the calculated acceleration/deceleration profile.

19. The vehicle of claim 15, wherein the controller is further configured to provide the driver feedback in response to a driver request.

* * * * *